United States Patent [19]
Cordy, Jr.

[11] Patent Number: 5,190,365
[45] Date of Patent: Mar. 2, 1993

[54] BACKLIGHTING FOR LIQUID CRYSTAL DISPLAYS

[75] Inventor: Clifford B. Cordy, Jr., Central Point, Oreg.

[73] Assignee: Apple Computer, Inc., Cupertino, Calif.

[21] Appl. No.: 778,437

[22] Filed: Oct. 16, 1991

[51] Int. Cl.$^5$ ............................................. G01D 11/28
[52] U.S. Cl. ........................................ 362/26; 362/31; 362/223
[58] Field of Search ................... 362/26, 27, 31, 223

[56] References Cited
U.S. PATENT DOCUMENTS 4,729,068  3/1988  Ohe ................................. 362/26 X
5,055,978 10/1991  Rogoff ............................. 362/26 X

*Primary Examiner*—Stephen F. Husar
*Attorney, Agent, or Firm*—Jonathan B. Penn

[57] ABSTRACT

An improved backlighting system for electronic displays that require such backlighting is disclosed. The system comprises a fluorescent lamp with improved visible light generating means and a reflector means for channeling the light generated by the lamp into the electronic display. In particular, the lamp comprises, in a preferred embodiment, a cylindrical glass housing, sealed at both ends and containing a plasma which can be excited to generate short wavelength light. A strip of phosphorescent material is placed along the inside surface of the tube, the strip being relatively restricted in width, its width being partially determined by the thickness of the electronic display. A reflector surrounds the lamp and helps drive the light the lamp generates into the phosphor. The lamp is also comprised of a glass transparent to the frequencies of light generated by the plasma. By limiting the width of the florescent area to a strip, light efficiency (the ratio of light out of the display to the electrical power into the lamp) increases and power consumption is also reduced. Additionally, the incorporation of one of several types of light concentrators between the lamp and light guide can improve the light efficiency still further.

8 Claims, 4 Drawing Sheets

BACKLIGHTING FOR LIQUID CRYSTAL DISPLAYS

BACKGROUND OF THE INVENTION

This invention is in the field of displays for computers and other electronic devices. More particularly, this invention relates to displays requiring an external light source for reading the display in low ambient light conditions.

Reducing power consumption is a desirable goal in the design of any electronic device. This goal becomes even more important when the electronic device is battery powered. In particular, designers of portable personal computers go to great lengths to reduce power consumption, as every reduction in consumption leads to greater battery life from a single battery charge and increased user convenience.

Many portable computers use a display that requires separate illumination. For example, liquid crystal displays ('LCD' s) do not generate their own light and therefore require separate illumination when operated in environments with low ambient light. Most often, a fluorescent lamp is used to illuminate the LCD from behind the LCD or from its side. Where such lights are used, they frequently account for from 30 to 40% of the power that the portable computer is using.

In common installations of LCDs and fluorescent lamps, the lamp is not mounted directly behind the display, where it would create a bright streak across the display, as well as necessitating a very thick display module. Instead, the lamp is mounted across one or more sides (an additional lamp being needed for each additional side illuminated) of the display and the light from the lamps is funneled into a plastic sheet behind the display. The plastic sheet is roughened in such a way that the light is scattered out of it to illuminate the display evenly. The plastic sheet is usually a few millimeters thick. In this description and in the industry, this plastic sheet is known as a light guide. Although the term "light guide" has also been used to describe other devices, including fiber-optic cables, its use herein will be restricted to describing the panel used to diffuse light across the back of the LCD.

Unfortunately, the coupling of light from the lamp into the display is not very efficient. Typically, only about 10% of the visible light generated by the lamp is actually coupled into the light guide.

A known lamp/display configuration is shown in FIG. 1. This standard mounting places lamp 10 at the edge of light guide 14. Reflector 20 is wrapped around lamp 10 to improve the coupling of light into plastic sheet 14. Lamp 10 additionally comprises plasma region 12 and phosphor layer 18. Although reflector 20 improves the light coupling somewhat, light that is emitted by plasma region 12 in an undesired direction must pass through phosphor layer 18 twice before there is any possibility of the light being coupled into light guide 14. Phosphor layer 18 is not transparent. Rather, it is moderately translucent. Therefore, most light that is initially misdirected is ultimately absorbed by phosphor layer 18 and converted to useless heat.

One effort to improve light coupling has involved making the bore of the fluorescent lamp smaller. This unfortunately increases the lamp's power density and consequently reduces the lamp's life. Also, small bore fluorescent lamps tend to have unstable plasma regions, leading to less reliable lamps.

Another known effort to modify a lamp to improve its coupling into a light guide involves leaving a small gap in the lamp's phosphor layer on the side of the lamp adjacent to the display. This arrangement is illustrated in FIG. 2, wherein phosphor layer 17 has a gap 9 left in it. Gap 9's purpose is to form an optical cavity from which photons can escape in only the desired direction. Unfortunately, this change in design results in little improvement. As phosphor layer 17 is not particularly reflective, a photon that is generated within the lamp is more likely to be absorbed by phosphor layer 17 (see lines B, E, F and G, FIG. 2) than it is to be reflected and escape through gap 9. Second, as in the lamp illustrated in FIG. 1, most light that escapes from the lamp through glass layer 16 and that is then reflected back through the glass into the lamp by reflector 20 is reabsorbed and converted into heat by phosphor layer 17 (see line D, FIG. 2).

Once light has found its way into light guide 14, light guide 14 acts to distribute the light evenly across the display. Often, scattering centers are made on or in the light guide to scatter the light out into display 22 (FIG. 1). Some of the scattered light escapes from the plastic sheet in the wrong direction, away from the display. To correct this, a common practice is to place a sheet of white plastic behind the plastic sheet to reflect this misdirected light back to the display.

Known lamp/display arrangements result in large losses of light, and consequently waste a great deal of power, in order to illuminate adequately the display to which they are coupled. An arrangement which could reduce these large losses and consequently reduce electrical power requirements would be a significant improvement.

SUMMARY OF THE INVENTION

A first embodiment of the present invention comprises a lamp and light guide arrangement that greatly improves the efficiency with which light is coupled into the light guide. Although this improved arrangement will be discussed herein with reference to its use with an LCD, nothing herein restricts this invention to use with such displays only. The present invention could be incorporated into any electronic device whose display requires illumination, and nothing herein should be taken to restrict the present invention to any one type of display or any one type of electronic device.

In this first embodiment, the phosphor coating of the lamp is coated in only a single strip upon the inside surface of the lamp (assuming a cylindrical lamp) that will be adjacent to, and optically coupled into, the light guide. Additionally, the short wavelength light (blue to ultraviolet) that leaves the lamp's plasma region in any direction other than toward the phosphor strip is reflected back through the lamp towards the phosphorescent material. Also, the visible light leaving the phosphorescent strip on the lamp is coupled more efficiently into the display using focussing and/or non-focussing concentrators. Finally, a reflective metal coating may be deposited directly on the back side of the light guide so light scattered away from the display is efficiently reflected back toward the display. The use of a metal foil would be more efficient than the white plastic sheet now used.

Other details and further embodiments of the present invention will now be explained with reference to the figures listed and described below.

BRIEF DESCRIPTION OF THE ILLUSTRATIONS

DETAILED DESCRIPTION OF THE PREFERRED EMBODIMENT(S)

Figure 1:
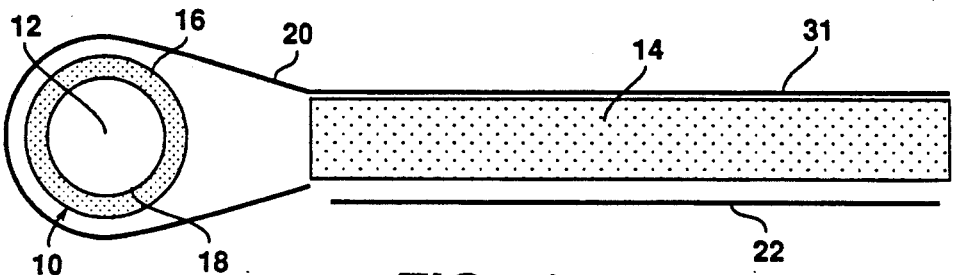
FIG. 1 shows a known lamp and LCD combination.
Figure 2:
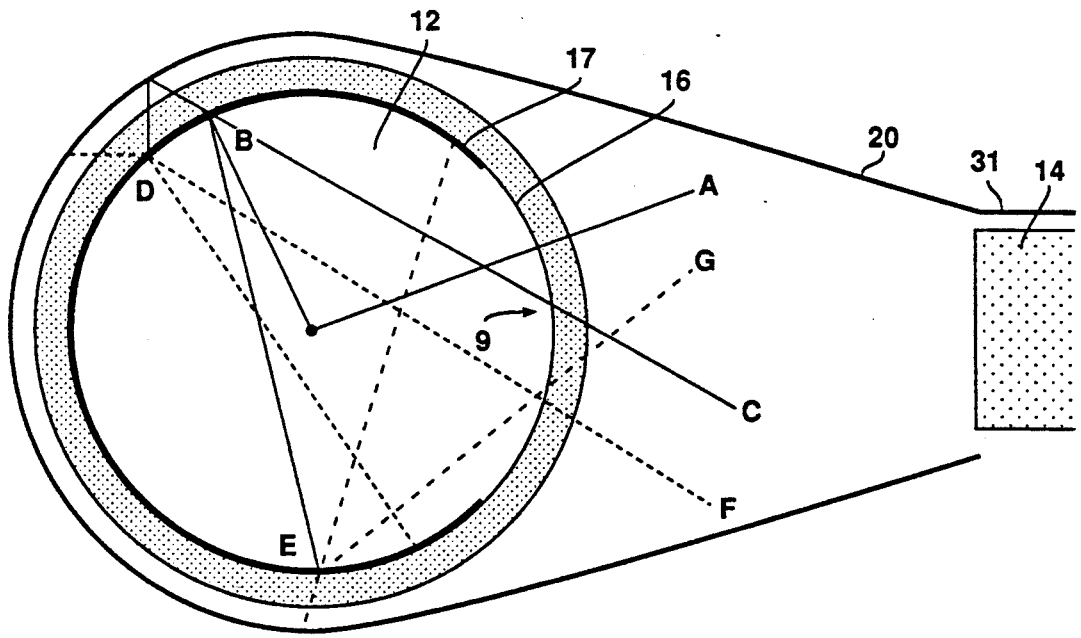
FIG. 2 shows another known lamp and LCD combination.
Figure 3:
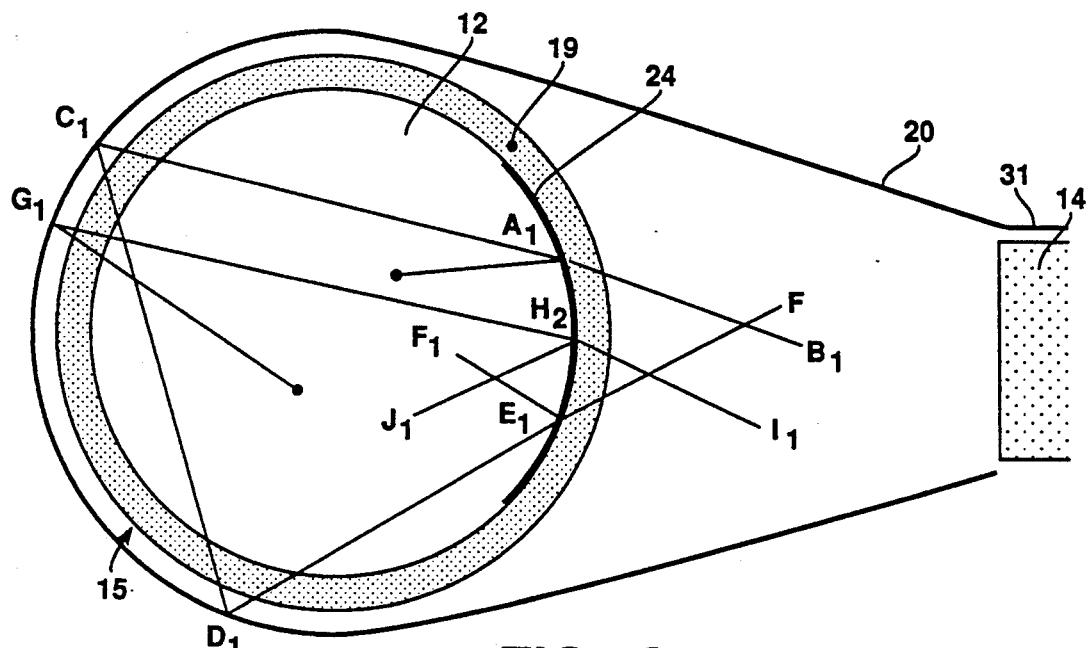
FIG. 3 shows a first embodiment of the present invention.

FIG. 3 illustrates a first embodiment of the present invention. Lamp 15 comprises inner plasma region 12 and phosphor strip 24. Strip 24 is roughly adjacent to light guide 14. It should be noted that the limitation of strip 24 to the portion of the lamp adjacent to the light guide is in complete contrast to the known art, where everything except the portion of the lamp adjacent to the light guide was coated with phosphor or the entire inner surface of the lamp was coated with phosphor. In the present invention, the total visible light from the lamp is not great, but the brightness of the phosphor area (power per unit ares) is as great as that of conventional lamps.

With only a fraction of lamp 15 coated with phosphor, a great deal of blue and ultraviolet ('UV') light leaves plasma region 12 and travels through glass 19 in other directions. This light is reflected back through glass 19 by means of reflector 20 and strikes phosphor strip 24, where it is absorbed, generating more useful visible light. Reflector 20 can take the same physical form as known reflectors or it may take a more sophisticated shape (see FIG. 4, reflector 45). In present systems, the reflector is only designed to reflect visible light, as all short wavelength light is absorbed in the glass of the lamp. In these known lamp/reflector systems, the lamp reflector serves to reflect visible light emitted in an unusable direction back to the phosphor, with the intent that some fraction of the light so reflected will be scattered in a usable direction. In the present invention, the reflector continues to serve this function, but its main purpose is to reflect short wavelength light from the plasma back toward the phosphor strip where it can be converted to visible light. The reflector may be a simple metal reflector, a dielectric mirror tuned to the pump wavelength of the phosphor layer, or a combination of these. The reflector may be separate from the lamp or it may be deposited directly on the outside of the lamp. Indeed, in the case of a dielectric reflector, the reflector could be deposited on the inside of the lamp.

In general UV light that is reflected back toward phosphor strip 24 will travel through the lamp's plasma region 12 before it reaches phosphor strip 24. At the operating current densities in lamp 15, the plasma remains relatively transparent to UV light. Even light that is absorbed in the plasma goes towards heating the plasma, which results in still more UV and blue light being emitted. The plasma region is a fairly efficient thermal to electromagnetic energy converter.

Figure 4:
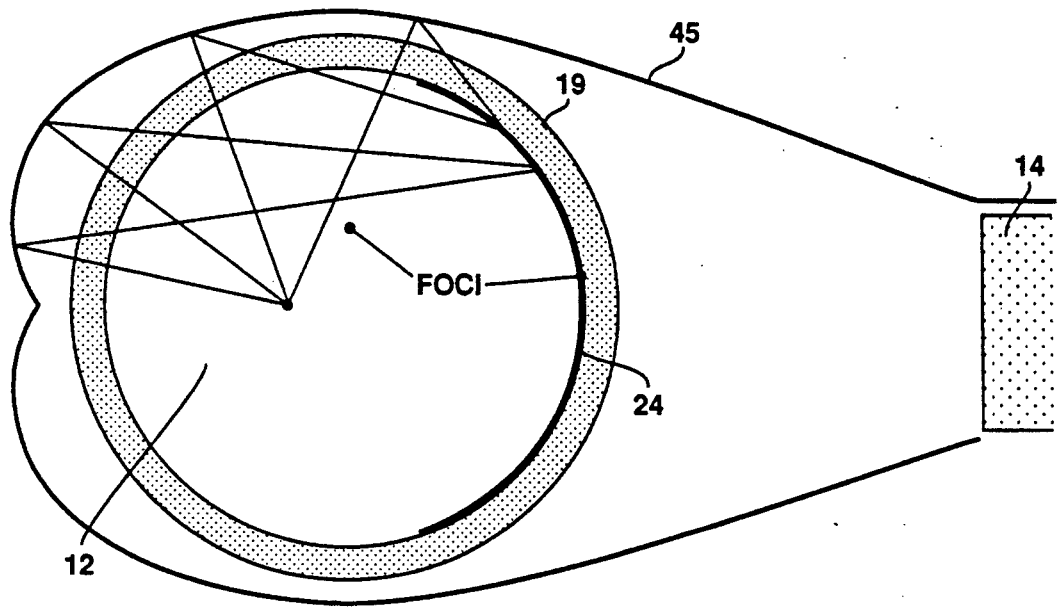
FIG. 4 shows the present invention when a non-cylindrical lamp reflector is used.

An additional increase in brightness can be achieved if the lamp's reflector is not cylindrical. In FIG. 4, the shape of reflector 45 approximates a pair of ellipses with the foci located away from the axis of the lamp. Using reflector 45, short wavelength light from plasma region 12 tends to be reflected to phosphor strip 24 without passing through the center of plasma region 12 twice. Lamp 15 is not evenly filled with plasma. In lamps of this type, the walls of the lamp quench the lamp's discharge, forcing the current to flow through the lamp as far from the walls as it can, primarily through the center of the lamp. The magnetic field associated with the electric current also tends to confine the current to the center of the lamp. Counterbalancing these forces, the plasma has a resistivity that tends to distribute the current evenly across the bore of the lamp. The plasma density distribution that results represents the minimum energy balance between these factors and several other, generally less important ones. In the present invention, the plasma is densest in the center of the lamp and decreases in density radially to zero at the lamp's inner surface. The brightest short wavelength light source, as well as the most absorptive region (emissivity=absorptivity), is thus the lamp's center. Much of the short wavelength light emitted by this region is misdirected. Reflector 45 redirects much of this light back to phosphor strip 24 in such a way that the reflected light misses the center of plasma region 12 entirely, thereby limiting the loss of short wavelength light and insuring that more of this light strikes the phosphor to generate visible light. Although the shape of reflector 45 illustrated in FIG. 4 is roughly elliptical, many other shapes are available whose performance would be superior to that of a cylinder. As each LCD and computer system has a different physical configuration, the optimum reflector shape and size would need to be determined in the specific environment it was to be used in.

Typically, the reflector will be placed outside the lamp. In that case, glass layer 19 used to make the lamp will have to be transparent to the wavelengths of light of interest for pumping the phosphor. Although this may occasion a change in the glass used to make the lamp, glasses with the desired characteristics are readily available.

In operation, once plasma region 12 begins to generate photons, some of these photons, which are generally of short wavelength, strike phosphor strip 24 directly, as shown at A1 (see FIG. 3). These photons generate visible light in all directions, some in the desired direction (B1), and some in undesired directions (C1). The photons which went in undesired directions may be reflected only once of they may be multiply reflected (D1), with some of them eventually reaching phosphor strip 24 again (E1). Most of the photons which strike phosphor strip 24 at E1 are absorbed or scattered, as illustrated by F1. Other short wavelength photons leave the plasma region and are reflected by reflector 20 (G1) and will then strike phosphor strip 24 at H1, generally after a single reflection. Again, visible light is produced by the collision at H1, which light scatters in all directions (see I1 and J1). The photons which do not start in the desired direction (J1) may still be captured in the same manner as those photons which struck at point C1. The remaining short wavelength photons are absorbed in the reflector, which results in the loss and waste of their energy, and in plasma region 12, which yields additional heat to stimulate the plasma. It is estimated that the intensity of ultraviolet light that strikes strip 24 is roughly twice as great as in a standard, known lamp. Also, more of the visible light that begins its travels in the wrong direction will eventually be scattered to the display on subsequent reflections than in the known art.

Figure 6:
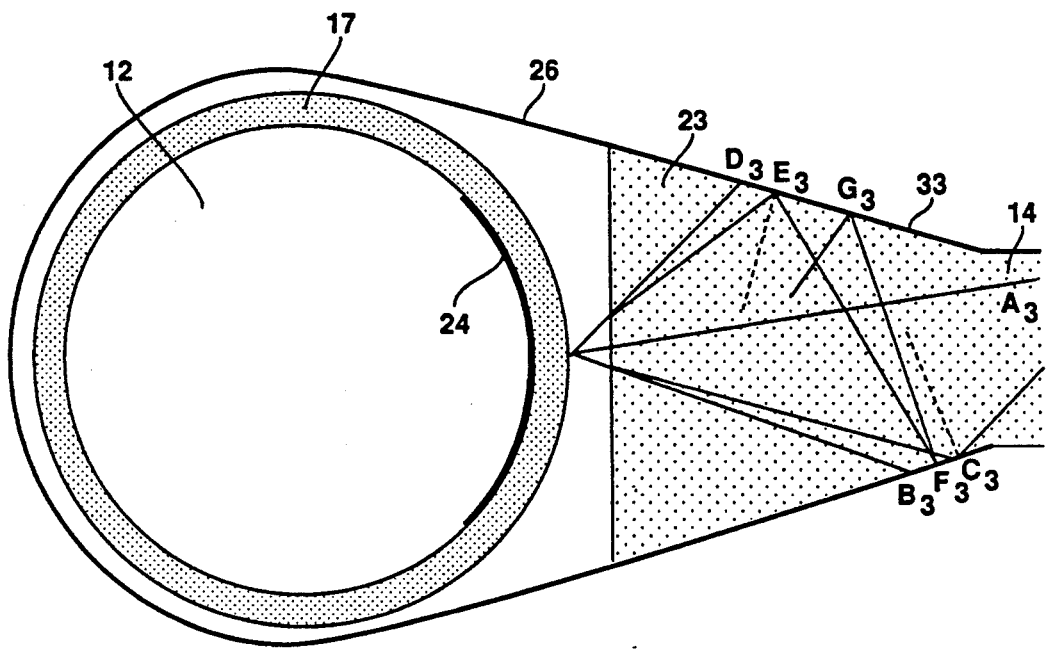
FIG. 6 shows the present invention when a concentrator with a flared edge and a light guide are used in combination.
Figure 7:
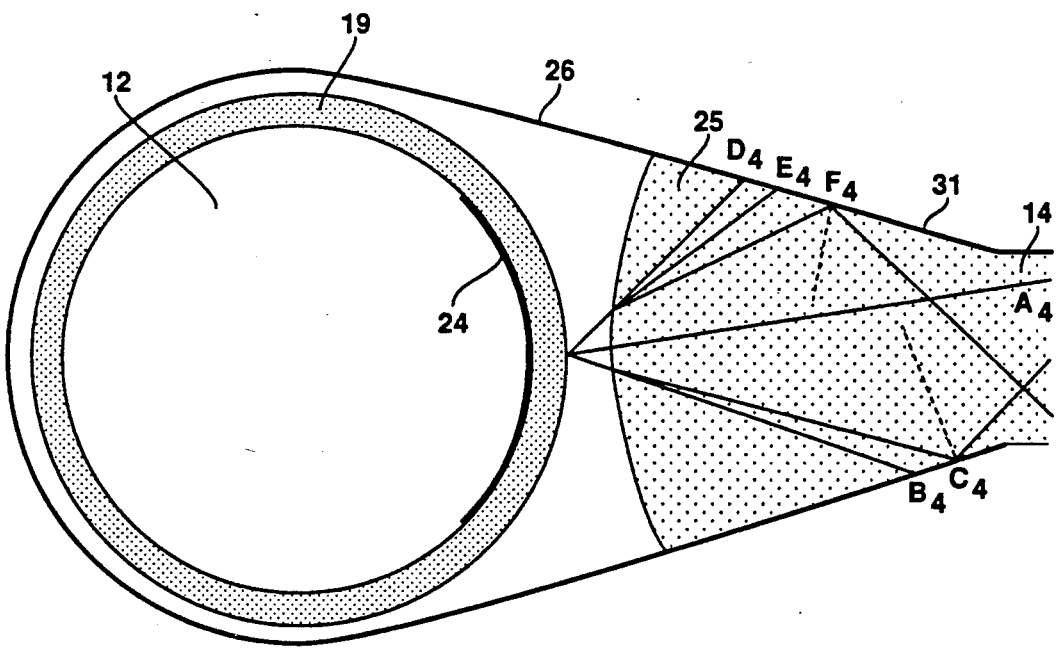
FIG. 7 shows the present invention when a flared and lensed concentrator and light guide are used.

As shown in FIGS. 1, 2, 3, 4, and 5, the light guide in the known art and a first embodiment of the present invention is normally backed by a white plastic sheet 31. A higher reflectivity can be achieved by depositing a reflective coating directly on the light guide. This is shown in FIGS. 6 and 7. If this is done after a concentrator is attached to the edge of the light guide, the deposited coating can extend over the concentrator and light guide sections to maximize the reflectivity of both parts. In addition to creating a higher optical efficiency, the deposited reflective coating weighs less and is easier to assemble.

Figure 5:
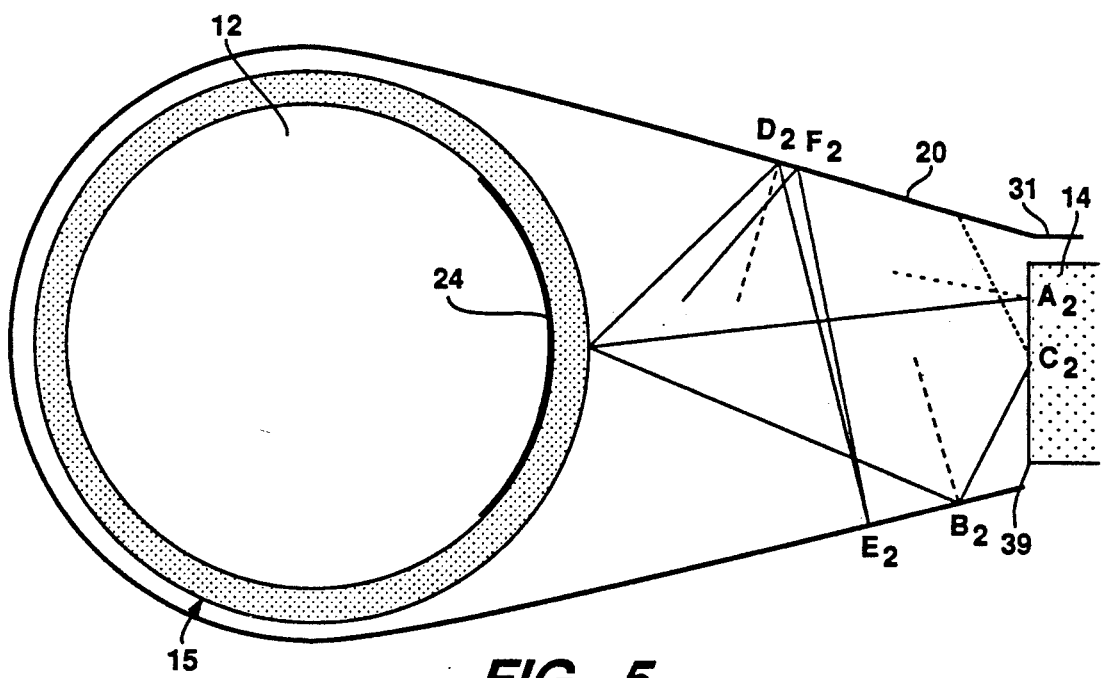
FIG. 5 shows the present invention when a standard concentrator and a standard light guide is used.

FIG. 5 illustrate the operation of the present invention when it is used with a standard concentrator. In the present invention, the region between the lamp and the light guide is called the concentrator region. In the concentrator section, the light that strikes the reflector is not reflected back towards the lamp, but rather it reaches the light guide after one or more reflections. This is true of all the concentrator sections described herein, whether they are filled with plastic or not. Some photons enter light guide 14 directly from lamp 15 at A2. These photons suffer only a minor reflection loss at air-to-plastic interface 39. Other rays hit reflector 20 near light guide 14 at B2 and are reflected into light guide 14 at C2. These photons strike at a large angle of incidence and suffer a large reflection loss. Other photons strike the reflector further from light guide 14 at D2 and are reflected back out of the concentrator before reaching the light guide at E2 and F2.

The second embodiment of the present invention shown in FIG. 6 has a flared, plastic filled section 23 in light guide 14. As plastic has a higher index of refraction than air, this alone tends to improve the efficiency of the concentrator section, based on known non-focussing concentrator theory. Additionally, reflective metal foil 33 may be coated directly onto section 23 and guide 14. As shown, photons traveling the path delineated by A3 still enter the guide with only minor reflection losses. Photons traveling path B3 have slightly higher reflection losses than those traveling along path A3, but these losses are still much less than those illustrated by path B2 in FIG. 5. Photons emitted along path B3 are refracted as they enter the flared plastic and strike the reflector at C3, instead of B3. Photons which in FIG. 5 struck at D2 (in FIG. 6, D3), now strike the reflector of E3 and F3 and are reflected out of the light guide. However, an entire range of photons which had to be reflected into the light guide in the embodiment illustrated in FIG. 5 would be transmitted directly into the light guide in this second embodiment without reflection losses. Also, a range of photons that would have been totally lost in the embodiment of FIG. 5 will enter the light guide of the embodiment illustrated in FIG. 6.

Flared section 23 has at least two purposes. First, it refracts the light that enters it towards the normal to its own surface. This results in a larger fraction of the incident light arriving at the edge of the light guide. Second, it eliminates the reflection loss at the edge of the light guide. For this loss to be prevented, the joint between flared section 23 and light guide 14 must be optically connected, with no index of refraction mismatch which would occur if the junction had an air gap or if optically dissimilar materials were used in section 23 and guide 14. Any method of eliminating an index mismatch would be satisfactory, including making the concentrator and the light guide from the same or optically similar materials and bonding them with the appropriate agent, or forming the concentrator and light guide as a single entity.

There are reflection losses at the entrance to the concentrator (section 23). However, these are smaller than those which occurred previously at the entrance to the light guide as the photons are entering closer to the normal. If an anti-reflection coating were added to the surface of the concentrator, losses could be further reduced.

Another possible shape for the lamp/light guide interface is illustrated in FIG. 7, which shows a concentrator wherein the plastic has been both flared and provided with a cylindrical lens 25. This shape allows for the collection of an even greater percentage of the photons emitted by the lamp than those illustrated in FIGS. 3, 5, and 6. Many of the photons that were entirely lost from the lamp and concentrator shown in FIGS. 5 and 6 will enter the light guide using the lens shown in FIG. 7. For example, the ray shown as D2 in FIG. 5, which traveled the path shown by E3 in FIG. 6, now takes the path indicated by F4 in FIG. 7, which shows how these photons are reflected directly into the light guide. It should be noted that the description of the optical connection between the concentrator and the light guide in FIG. 6 is also applicable to the same components in FIG. 7.

The present invention has now been described in detail, in the context of several specific embodiments. Nothing herein should be taken to limit this invention to the particular embodiments discussed. Fox example, any number of modifications can be made to the reflector/light guide to obtain optimum light transmission without departing from the spirit of this invention. Similarly, the exact width of the phosphor strip within the lamp can be varied to obtain optimum performance in various different applications. Given the various possibilities, the specification and drawings are, accordingly, to be regarded in an illustrative rather than in an restrictive manner.

What is claimed is:

1. A lamp for illuminating a display, the lamp being adjacent to a light guide, the light guide underlying the display, the lamp comprising:
   a plasma region for generating short wavelengths of light;
   a plasma container surrounding the plasma region and having an inside and outside surface, for restricting the plasma to a specific region; and
   phosphorescent region deposited on the inside surface of the plasma container, the phosphorescent region converting the short wavelengths of light to visible light, the phosphorescent region being adjacent to the light guide.

2. The lamp of claim 1 wherein the plasma container comprises a lengthwise cylindrical tube and the phosphorescent region comprises a strip running lengthwise along the inside of the tube, the phosphorescent region being at least equal in width to the light guide.

3. A fluorescent lamp for illuminating a liquid crystal display, the liquid crystal display being of generally rectangular shape and having a front display region and a back region, the back region having a generally rectangular light guide resting thereon, the lamp comprising cylindrical plasma containing vessel, the vessel containing a plasma for generating short wavelength electromagnetic waves, the vessel further comprising means for applying an electric current to the plasma in order to force it to generate the electromagnetic waves; and phosphorescent region located on the inside of the cylindrical vessel, the region generally comprising a strip running the length of the cylinder, the strip being directly adjacent to the liquid crystal display and the light guide, the phosphorescent region converting the electromagnetic waves that impact upon it to visible light, which is then transmitted through the light guide.

4. In an electronic device having a display, the display requiring backlighting to provide sufficient illumination to read the display in low ambient light conditions, the display having a front and rear surface, a system for providing the backlighting comprising:

light distributing means to distribute the light throughout the area behind the back of the display, the light distributing means being situated behind the display;

light producing means for generating visible light of the desired wavelengths, the light producing means being adjacent to the light distributing means, the light producing means further comprising a cylindrical tube containing a light generating plasma, the cylindrical tube having an inner and outer surface, the ends of the tube being sealed to contain the plasma and the ends of the tube being provided with electrical connections to provide electrical energy to the plasma to generate short wavelength light and a phosphor strip extending lengthwise along the inside surface of the tube, the phosphor strip being situated on the side of the tube adjacent to the light distributing means, the strip being at least equal in width to the light distributing means and no wider than half the circumference of the tube; and light reflecting means for reflecting all light produced by the light producing means towards the light distributing means, the light reflecting means being adjacent to the light producing means and coupled to the light distributing means.

5. The system of claim 4 wherein the light reflecting means surrounds the light producing means along its lengthwise axis, the reflector means being non-cylindrical and shaped such that light produced by the light generating plasma is reflected back through the light producing plasma to the phosphor strip but along paths that minimize the distance that the light will have to transit through the light generating plasma.

6. The system of claim 4, the system additionally comprising a concentrator means located between the light producing means and the light distributing means, the concentrator means receiving light generated by the light producing means and reflected by the light reflecting means and redirecting that light into the light distributing means, the concentrator means having an index of refraction greater than one.

7. The system of claim 6 wherein the concentrator means comprises a strip optically coupled to one edge of the light distributing means, the strip having a flared trapezoidal cross section, the thin edge of the concentrator means being equal in thickness to the light distributing means and the flared edge being approximately equal in width to the light producing means.

8. The system of claim 7 wherein the flared edge is curved to form a cylindrical lens.

* * * * *